(12) United States Patent
Han et al.

(10) Patent No.: US 8,320,750 B2
(45) Date of Patent: Nov. 27, 2012

(54) METHOD FOR IMPROVING COOLING CAPACITY OF A POWER STATION DIRECT AIR-COOLING SYSTEM AND THE COOLING SYSTEM THEREOF

(75) Inventors: Chunjiang Han, Beijing (CN); Peng Guo, Beijing (CN); Yuyang Gong, Beijing (CN)

(73) Assignee: China Datang Technologies & Engineering Co., Ltd., Beijing (CN)

( * ) Notice: Subject to any disclaimer, the term of this patent is extended or adjusted under 35 U.S.C. 154(b) by 0 days.

(21) Appl. No.: 12/601,511

(22) PCT Filed: Dec. 5, 2008

(86) PCT No.: PCT/CN2008/001974
§ 371 (c)(1),
(2), (4) Date: Nov. 23, 2009

(87) PCT Pub. No.: WO2010/060235
PCT Pub. Date: Jun. 3, 2010

(65) Prior Publication Data
US 2011/0214845 A1    Sep. 8, 2011

(30) Foreign Application Priority Data

Nov. 28, 2008  (CN) .......................... 2008 1 0227678

(51) Int. Cl.
*H02P 5/00* (2006.01)
(52) U.S. Cl. ........................................ 388/800; 388/820
(58) Field of Classification Search .................. 388/800, 388/805, 814, 820, 908
See application file for complete search history.

(56) References Cited

U.S. PATENT DOCUMENTS

| | | | | |
|---|---|---|---|---|
| 4,698,774 A | * | 10/1987 | Abe et al. | 700/212 |
| 4,742,441 A | * | 5/1988 | Akerson | 363/97 |
| 5,375,429 A | * | 12/1994 | Tokizaki et al. | 62/235.1 |
| 6,747,881 B2 | * | 6/2004 | Schreiber | 363/37 |
| 7,196,485 B1 | * | 3/2007 | Lee et al. | 318/400.38 |

OTHER PUBLICATIONS

Rattan Tawney et al., Economic and Performance Evaluation of Heat Sink Options in Combined Cycle Applications, Journal of Engineering for Gas Turbines and Power, Apr. 2005, vol. 127, p. 397-403.
Yang Lijun et al., Operation Problems and Solutions for Direct Air2cooled Condenser System, Modern Electric Power, Apr. 2006, 52-55, vol. 23 No. 2.

* cited by examiner

*Primary Examiner* — Rina Duda
(74) *Attorney, Agent, or Firm* — WPAT, P.C.; Anthony King

(57) ABSTRACT

The present invention belongs to power generation field. It relates to a method for improving cooling capacity of a power station direct air-cooling system and the cooling system thereof. According to the present invention, a transformer in a cooling system is connected to a voltage of the power grid and outputs a voltage to an electric motor, so that its working voltage reaches 380-390V; a frequency of 40-47 HZ is output from a frequency converter in the cooling system to the electric motor; a fan is driven by the electric motor working under 380-390V and 40-47 HZ to rotate according to a set velocity ratio with the aid of a speed reducer, and cooling wind is delivered by the rotating fan head-on to a heat radiator. The present invention can be widely applied in rebuilding of existing direct air-cooling units, or designing of new power station direct air-cooling systems.

14 Claims, 3 Drawing Sheets

METHOD FOR IMPROVING COOLING CAPACITY OF A POWER STATION DIRECT AIR-COOLING SYSTEM AND THE COOLING SYSTEM THEREOF

CROSS-REFERENCE TO RELATED APPLICATIONS

This is a National Stage application which claims priority to, PCT/CN08/001974, filed on Dec. 5, 2008, which claims foreign priority to application number, CN200810227678.8, filed on Nov. 28, 2008, now pending, which are hereby incorporated by reference in their entirety.

Although incorporated by reference in its entirety, no arguments or disclaimers made in the related application apply to this application. Any disclaimer that may have and occurred or might occur during the prosecution of the above-referenced application is hereby expressly rescinded.

TECHNICAL FIELD

The present invention belongs to the technical field of power generation. It relates to a power station direct air-cooling system, especially to a method for improving cooling capacity of a power station direct air-cooling system, and a cooling system of a power station direct air-cooling system.

BACKGROUND ART

A cooling system is an import link in the process of power generation. Steam exhaust which has done work needs to be condensed in a steam condenser, and recycled again.

There are two types of power station cooling systems, water-cooling and air-cooling, and the main difference there between lies in the cooling system. A power unit adopting an air-cooling system takes ambient air rather than water as a cooling medium of steam exhaust from a steam turbine.

There are two types of power station air-cooling systems. One type is indirection air-cooling systems, which can be divided into composite type air-cooling systems and surface type air-cooling systems. As in indirection air-cooling systems, cooling water from a surface type steam condenser of a steam turbine is cooled in a cooling tower. Another type is direct air-cooling systems (ACC). As for direct air-cooling, steam exhaust from a steam turbine is directly cooled by air, and the air and the steam are heat exchanged.

Direct air-cooling systems which have effectively solved the conflict between rich of coal and lack of water is a representative of the trend of future air-cooling systems (see, Tawney R, Khan Z, Zachary J. Economic and performance evaluation of heat sink options in combined cycle applications [A]. proceeding of Turbo Expo [C]. ASME/IGTI Turbo Expo, Atlanta, Ga., UAS, 2003).

The first 1500 KW direct air-cooling unit in the world was put into operation in 1938 in a mine-mouth power plant in Germany. Currently, Germany and USA are leading in the direct air-cooling technology. Existing direct air-cooling systems include German single tube, double tubes systems, and American single tube, triple tubes systems.

The principle of operation of a power station adopting direct air-cooling systems is shown as FIG. 1, wherein water is sent to a boiler by a pump, and is heated to overheat condition by burning fuel (coal, oil, natural gas or coal gas etc), and the over heat steam is sent by a pipeline to a steam turbine, which drives the power generator to generate power. The steam which has done work, whose pressure and temperature is reduced to 5 Kpa (kilopascal) ~50 KPa and 30~38°, is delivered by a pipeline into a direct air-cooling heat radiator, where the heat of the steam is carried away by a flowing air from bottom to top with the aid of a cooling fan and the steam is cooled to water. After collection, the cooled water is sent again by the pump to heating in the boiler, thereby a circulation is formed.

In recent years, China has introduced such technologies for applications in power generation industry, for example, Datong second power plant (2×600 MW (1000 kilowatt) unit) introduced a German single tube direct air-cooling system, Datong Yungang power plant (2×200 MW unit) introduced a German double tube direct air-cooling system, and Yushe power plant (2×300 MW unit) introduced an American triple tube direct air-cooling system.

Currently, there are more than one hundred direct air-cooling power units that have put into operation in China, and all of them are large scale units (300 MW or more per unit). A ratio of the installed capacity of direct air-cooling power units and that of indirection air-cooling power units has been over 9:1.

The core part of a direct air-cooling system lies in a fan cooling system, as is shown in FIG. 2. Core devices of a fan cooling system include a transformer, a frequency converter, electrical cables, a frequency variable electric motor, a speed reducer and a fan. The transformer, frequency converter, and electrical cables provide a required power supply. The electric motor dives the speed reducer, which dives the fan to rotate, so that air is driven to flow from bottom to top. When the flowing air passing through the heat radiator, a convection heat transfer is formed, thus the heat of the steam is carried away, and the objective that the steam is cooled is achieved.

In china, direct air-cooling systems are yet in preliminary stage, and experience in designing and running is insufficient. What interests the power plants owners more is the reliability of the air-cooling system, rather than the economy of the optimization of designing air-cooling systems (see, *brief introduction of power station air-cooling systems*, issued by China Industrial Control Website on Nov. 10, 2008). The independence designing and independence unitizing of large scale power station air-cooling systems have been one of the important tasks for the localization of significant technical equipments of China.

In summer, when the temperature is the highest, in order to ensure a normal operation of the units, improving the heat transfer capacity between the ambient air and the steam exhaust of the steam turbine is required to maintain the pressure of the steam condenser in the cooling system at a normal level. The most effective way to improve the heat radiating capacity of the heat radiator is to raise the flowing rate of the cooling air, i.e., to raise the head-on wind speed of the air-cooling heat radiator, thus the rotation rate of the fan is required to raise (see, *Operation Problems and Solutions for Direct Air-Cooled Condenser System*, Yang Lijun, Du Xiaoze, Yang Yongping, Liu Dengying, Guo Yuenian, Modern Electric Power, Vol. 23, No. 2, April 2006).

As shown in FIG. 2, The operation parameter of fan cooling systems in existing power station direct air-cooling systems at maximum output capacity are:

Transformer input voltage (a): 6 KV (kilovolt) or 10 KV, output voltage: 380V (volt);

Frequency converter output frequency (d): 55 HZ (Hertz);

Electric motor operation frequency (f): 55 HZ;

Speed reducer velocity ratio (g): (rotation rate of the electric motor at 55 HZ)/(110% of the rating rotation rate of the fan).

However, a commonly existed phenomenon is that, under high temperature in summer, the output and the efficiency of the direct air-cooling systems are well short from the designed requirements, which has a strong impact on the economic efficiency of the power plant.

TABLE 1 data on power generation loss of several power plants in China

| No. | Power plant | Scale of construction (MW) | Maximum output of the unit in summer(MW) | Power generation loss (per year, MW) | remark |
|---|---|---|---|---|---|
| 1 | Datong second power plant(II) | 2 × 600 | 500 | 2 × 900 | ambient temperature: 30° C.; steam machinery back pressure: 30 KPa |
| 2 | Yuncheng power plant | 2 × 600 | 450 | 2 × 1350 | ambient temperature: 32° C.; steam machinery back pressure: 30 KPa |
| 3 | Tuoketuo power plant | 2 × 600 | 450 | 2 × 1350 | ambient temperature: 26° C.; steam machinery back pressure: 30 KPa |
| 4 | Ural Mountains power plant | 2 × 300 | 210 | 2 × 810 | ambient temperature: 28° C.; steam machinery back pressure: 30 KPa |

Note:
"per year" in the table is calculated in accordance with the hottest three months in summer and three hours every day.

DISCLOSURE OF THE INVENTION

The objective of the present invention is to provide a method for improving cooling capacity of a power station direct air-cooling system.

Another objective of the present invention is to provide a cooling system for a power station direct air-cooling system.

The method of the present invention includes the following steps.

1. a transformer in a cooling system is connected to a voltage of the power grid and outputs a voltage to an electric motor, so that its working voltage reaches 380-390V;
2. a frequency of 40-47 HZ is output from a frequency converter in the cooling system to the electric motor;
3. a fan is driven by the electric motor working under a voltage of 380-390V and a frequency of 40-47 HZ to rotate according to a set velocity ratio with the aid of a speed reducer, and
4. cooling wind is delivered by the rotating fan head-on to a heat radiator.

According to the present invention, an output reactor is arranged between the frequency converter and the electric motor, in order to restrain the interference of the harmonic waves to the electric motor.

According to the present invention, an input reactor is further arranged between the transformer and the frequency converter, in order to restrain the interference of the harmonic waves to the power grid.

The velocity ratio of the speed reducer is (the rotation rate of the electric motor at a frequency of 40-47 HZ)/(110-130% of the rating rotation rate of the fan).

The voltage drop scope of the input reactor is between 1%-5%, and the inductance value of the output reactor is between 30-50 nH.

The transformer is connected to a voltage of 10 KV or 6 KV of the power grid, and such voltage is transformed to a voltage of 400V. The input reactor is connected to the 400V voltage, and outputs a voltage of 395-398V to the frequency converter. The frequency converter functions between a frequency of 40-47 HZ, and outputs a voltage of 395-398V to the output reactor. The output reactor which is connected to the 395-398V voltage outputs a voltage of 385-395V through electrical cables. The electric motor functions under a voltage of 380-390V and a frequency of 40-47 HZ.

Long-term operation voltage endurances of the devices of the cooling system are: the transformer: 420V; the frequency converter: 480V; and the electric motor: 400V.

The cooling system of the present invention includes a transformer which is electrically connected by electrical cables, a frequency converter, an electric motor, a speed reducer and a fan, wherein the transformer is connected to a voltage of the power grid, and outputs a voltage to the electric motor through the frequency converter, which outputs a frequency to the electric motor, whose input terminal voltage is 380-390V and input frequency is 40-47 HZ.

The above mentioned system further includes an output reactor arranged between the frequency converter and the electric motor.

Also, there can be included an input reactor arranged between the transformer and the frequency converter.

The velocity ratio of the speed reducer is the rotation rate of (the electric motor at a frequency of 40-47 HZ)/(110-130% of the rating rotation rate of the fan).

The voltage drop scope of the input reactor is between 1%-5%, and the inductance of the output reactor is between 30-50 µH.

The said transformer is a dry-type transformer.

As shown in FIG. 3, the cooling capacity of the system is directly associated with the wind speed. The figure represents the wind speed of the heat radiator in dependence of the heat transfer coefficient K and the radiator pressure drop, from which it is observed that, K increases as the increasing of the wind speed, that is to say, the higher wind speed is, the better the heat exchange property is.

Theoretically, increasing the rotation rate of the fan can be achieved by increasing the rotation rate of the electric motor, i.e., infinitely increasing the rotation rate of the electric motor to increase the rotation rate of the fan. However, as is limited to the characteristics of the electric motor, 50 HZ is a turning point of the characteristics of the electric motor, below which value it outputs with constant moment, while above which value, it outputs with constant power. Accordingly, it is infeasible to increase the rotation rate of the fan by changing the rotation rate of the electric motor above 50 HZ.

Owing to the factors of manufacturing errors and designing errors etc. existed in the electric motor, the above mentioned theoretical data has a certain distance from the practical electric motor characteristics. FIG. 4 shows a performance curve of a practical electric motor under practical load, as is seen, the electric motor under practical operation reaches the critical point of property transition at around 47 HZ. It is known from the curve that, below 47 HZ, along with the increasing of the rotation rate of the electric motor, an increase of the power output can be achieved. But above 47 HZ, the output moment can not be increased no matter how the rotation rate of the electric motor is increased.

Under the above precondition, in order to increase the wind speed, one question is how to ensure that the electric motor can maximize the output, another question is how to efficiently transfer the torque output by the electric motor to the fan.

The torque output of the electric motor is: $T_N=9550*P_N/n_N$, wherein $T_N$: torque; $P_N$: electric motor power; $n_N$: electric motor rotation rate; $P_N=3U_1*I_1*\cos\theta=(n_N*T_N)/9550$, wherein $U_1$: electric motor input voltage; $I_1$: electric motor input current; $\theta$: phase angle.

As is seen from the above mentioned, when the voltage input of the electric motor is constant, the power output of the electric motor is changed as changing the current input (the torque output is also changed at the same time). Also, when the current input of the electric motor is constant, the power output of the electric motor is changed as changing the voltage input (the torque output is also changed at the same time). However in practical applications, a voltage change directly influences the current change.

Accordingly, in practical engineering, in case the voltage input of the electric motor can be ensured, the output capacity of the electric motor is basically provided with a guarantee.

Working parameters of fan cooling systems in existing power station direct air-cooling systems at their maximum output capacity are: transformer input voltage (a): 6 KV or 10 KV, output voltage: 380V; frequency converter output frequency (d): 55 HZ; electric motor working frequency (f): 55 HZ.

As is seen from FIG. 5, through measurements and analysis to laboratory test data of the electric motor working parameters under practical operation, the electric motor does not reach the designed rating voltage 380 KV at 55 HZ. When the electrical motor is working at 40-47 HZ (statistical data), the output voltage is the highest, which however is merely 90-95% of the rating voltage. Furthermore, not only the working voltage of the electrical motor is changed, but the working point of the electrical motor is also changed from 55 HZ to around 40-47 HZ (statistical data). Accordingly, in order that the output capacity of the electrical motor is excellently exerted, the working point of the electrical motor must be re-determined according to the practical situation, and the normal working voltage of the electrical motor should be ensured.

Through actual measurements, voltage drops in the system mainly take place in two parts: the reactor and the electrical cables. FIG. 6 represents the voltage output curve of the frequency converter, and through a comparison between FIG. 5 and FIG. 6, it is demonstrated that, voltage drops mainly take place in two parts: the reactor and the electrical cables.

Because of the voltage drop, working parameters of the component devices are:

Transformer input voltage (a): 6 KV or 10 KV;
input voltage of the input reactor (b): 380V;
frequency converter input voltage (c): 370-375V;
frequency converter output voltage and frequency (d): 370-375V, 55 HZ;
input voltage and frequency of the output reactor (e): 370-375 V, 55 HZ;
electric motor input voltage and frequency (f): 360-365V, 55 HZ.

On the other hand, the relation between the output torque of the electric motor and the frequency of the power supply is shown in FIG. 4. When the power supply is at 55 HZ, the electric motor loses 20% or more of the output torque, which has a strong impact on the output of the whole system.

In consideration of the above factors, according to the present invention, the voltage output of the transformer is increased from the present 380V to 400V, thus the input voltage of the electric motor can still reach 380-390V, even if the factor of voltage drop is existed.

According to the relation between the output torque of the electric motor and the frequency of the power supply, the present invention further reduces the output frequency of the frequency converter from the present 55 HZ to 40-47 HZ, so that the electrodes are operated within the range of being able to reach the maximum output torque and working voltage.

With the ensuring of a reliable output capacity of the electric motor, the next objective is to effectively transfer the output capacity of the electric motor to the fan. In order to amplify the output torque of the system, a speed reducer is arranged in the system, and the selection of the velocity ratio of the speed reducer directly influences the exertion of the capacity of the fan.

The wind speed of the fan is determined by the blasting volume of the fan. In order to increase the wind speed of the fan, the blasting volume must be increased.

The blasting volume of the fan is: $Q=K*N$, wherein Q: blasting volume; K: proportional constant; n: fan rotation rate.

Shaft power of the fan: $P=D*n^3=(n_N*T_N)/9550$, wherein P: fan shaft power; D: proportional constant.

It can be seen from the above two formulas that, under the precondition that the other factors are not changed, a flow rate of the fan can be increased by changing the rotation rate of the fan, yet the shaft power required by the fan also needs to be increased.

At this time, the relation between the power of the fan and the electric motor is: $P=P_N\eta_{electric\ motor}*\eta_{speed\ reducer}$, wherein $\eta_{electric\ motor}$: efficiency of the electric motor; $\eta_{speed\ reducer}$: efficiency of the speed reducer The relation between the electric motor rotation rate and the fan rotation rate is: $n_1=\lambda*n_2$, wherein $n_1$: electric motor rotation rate; $n_2$: fan rotation rate; speed reducer velocity ratio.

Since the system complies with the principle of conservation of energy in the energy transferring process, in spite of the relation between the electric motor and the fan, the relation between the output power of the electric motor and the input shaft power of the fan in regardless of the transmission efficiency is:

$P_N$: =P, wherein $P_N$: electric motor output power.

On basis of the above mentioned, there is: $(n_1*T_1)/9550=(n*T)/9550$, wherein $T_1$: moment of the electric motor at the output capacity point; $n_1$: electric motor rotation rate; T: fan import moment.

Thus there is: $\lambda=n_1/n=T_1/T=n_1*K/Q$

It is seen from above, the speed reducer functions to amplify the moment in the system, and the amplification coefficient is right the velocity ratio of the speed reducer.

Considering that the fan is desired to work under a pre-designed ideal condition, the velocity ratio of the speed reducer is theoretically (the rotation rate of the electric motor at maximum output capacity)/(the rotation rate of the fan at maximum blasting volume). The practical velocity ratio of existing systems is (the rating rotation rate of the electric motor)/(110% of the rating rotation rate of the fan), which is the ratio of the rotation rate of the electric motor working at 55 HZ and 110% of the rating rotation rate of the fan.

As shown in FIG. 4, when the power supply is at 55 HZ, the electric motor losses 20% or more of the output torque, which has a strong impact on the output of the whole system, resulting in that the velocity ratio of the speed reducer adopted by existing systems severely reduces the transferring efficiency of the output capacity of the electric motor to the fan, and the electric motor runs idle and can not effectively drive the fan.

On the other hand, adopting a 110% of the rating rotation rate of the fan did not consider the allowance of the fan. In consideration of the influence of natural wind, in order to enhance the resistance of the cooling wind to the influence of transection wind, the velocity ratio should be further reduced.

Accordingly, in consideration of the allowance of the fan and the influence of environmental wind, the velocity ratio adopted by the present invention is (the rotation rate of the electric motor working at 40-47 HZ)/(110%-130% of the rating rotation rate of the fan), while specific values are determined in accordance with the environmental wind.

Cooling systems of the present invention and prior arts can be compared by working parameters and results listed in table 2.

TABLE 2 comparison of the present invention and prior arts at maximum output capacity

| | The present invention | Prior arts |
| --- | --- | --- |
| Voltage range | 10 KV or 6 KV~400 V | 10 KV or 6 KV~380 V |
| Input voltage of the input resistant | 400 V | 380 V |
| Working frequency of the frequency converter | 40~47 HZ | 55 HZ |
| Input voltage of the frequency converter | 395~398 V | 370~375 V |
| input voltage of the output reactor | 395~398 V | 370~375 V |
| Frequency of the electric motor | 40~47 HZ | 55 HZ |
| Input voltage of the electric motor | 380~390 V | 360~365 V |
| Velocity ratio of the speed reducer | (electric motor rotation rate at 40~47 HZ)/(110-130% of the rating rotation rate of the fan) | (electric motor rotation rate at 55 HZ)/(110% of rating rotation rate of the fan) |
| Output torque of the electric motor | Increased by 20% or more | Unable to reach maximum output |
| Regulating range of the fan | Increased by 30% or more | small |

BEST MODE FOR CARRYING OUT THE INVENTION

The present invention is directed to reconstruct cooling systems of direct air-cooling system air-cooling systems that can not meet designed requirements under high temperature in summer. The present invention can also be used to design new direct air-cooling power stations.

A main factor influencing the direct air-cooling heat exchange effects is the head-on wind speed of the fan to the heat radiator. The head-on wind speed is a key parameter of systematic area calculation. Theories indicate that in a 300 MW unit, in case the head-on wind speed was increased by 0.1 m/s, the heat exchange area could be reduced by about ten thousand square meters.

Figure 1:
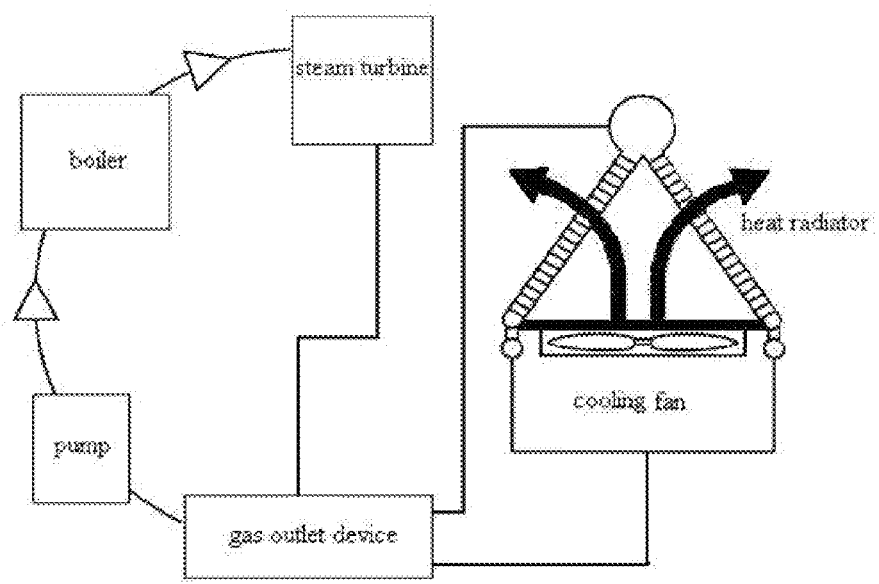
FIG. 1 shows a construction of an air-cooling system.
Figure 2:
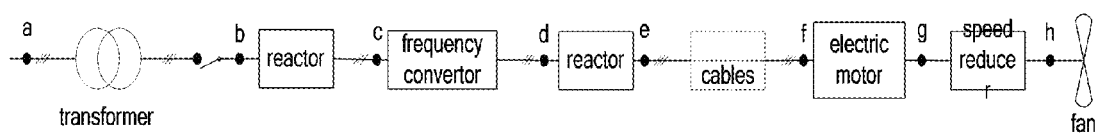
FIG. 2 shows a constitution of a cooling system of a direct air-cooling system.
Figure 3:
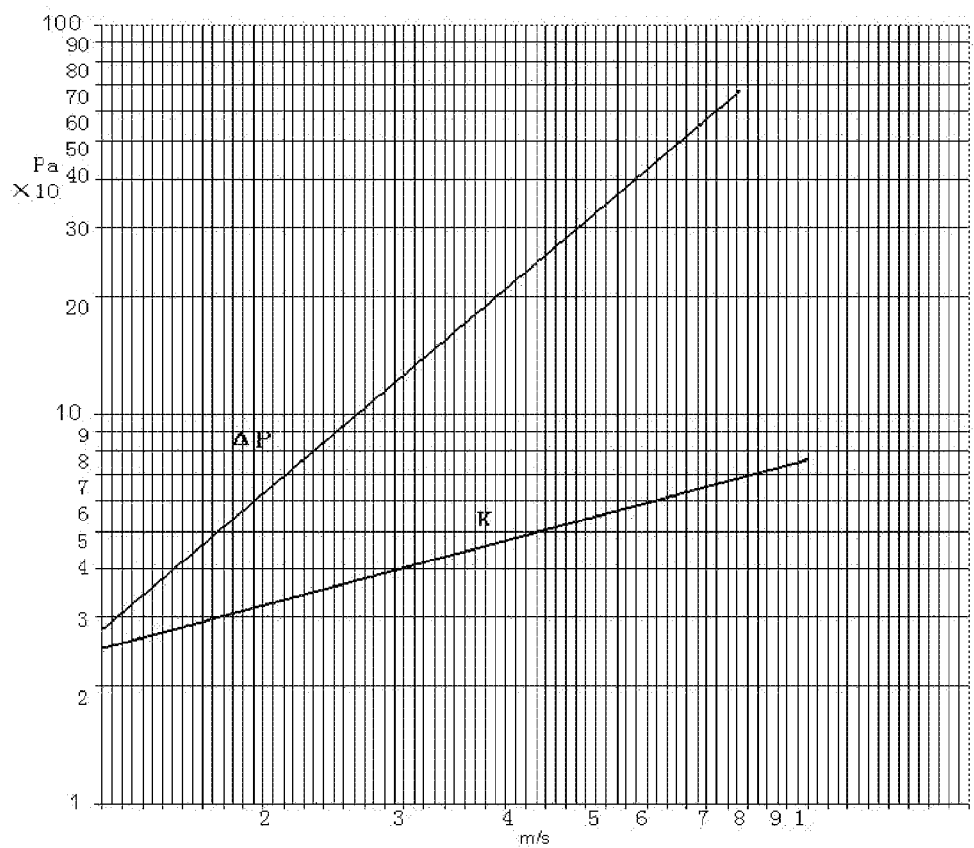
FIG. 3 show the relation between the wind speed of the heat radiator and the heat transferring coefficient K and the radiator pressure drop.
Figure 4:
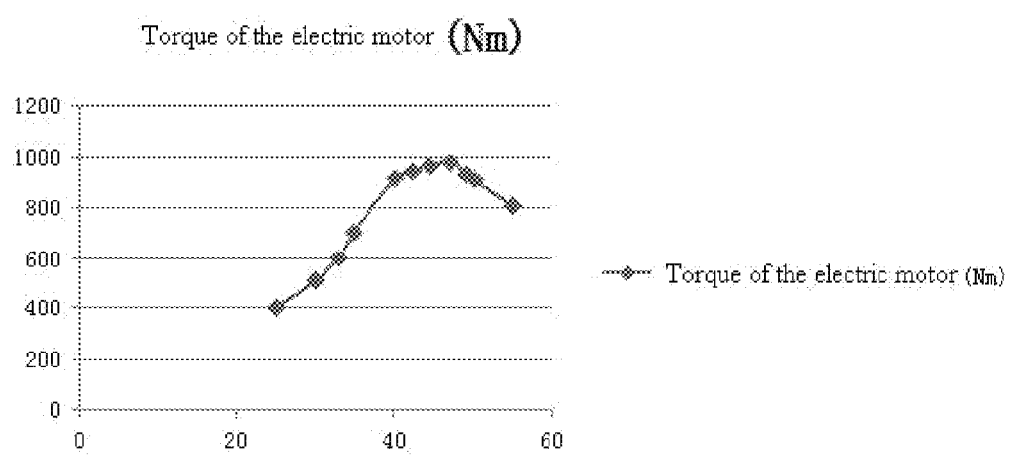
FIG. 4 shows the relation between the output torque and frequency of the electric motor.
Figure 5:
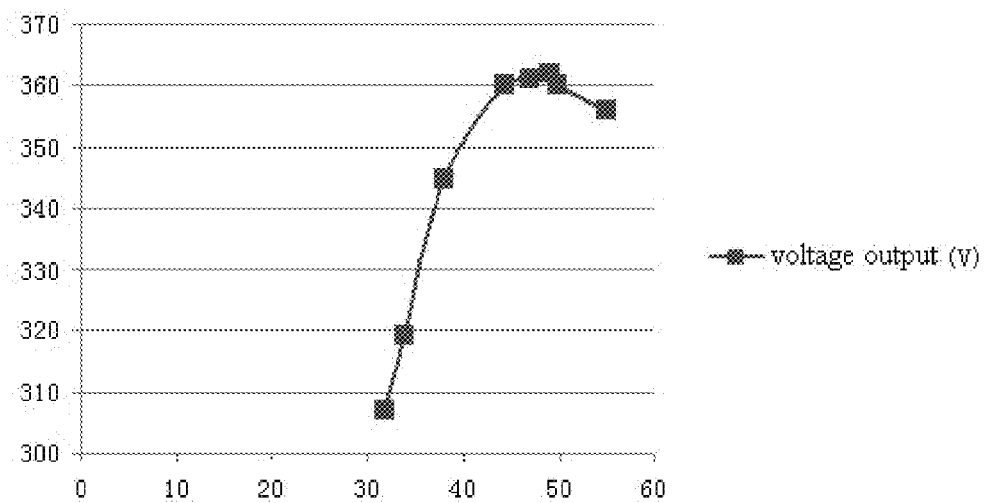
FIG. 5 shows the relation between the voltage and frequency of the electric motor.
Figure 6:
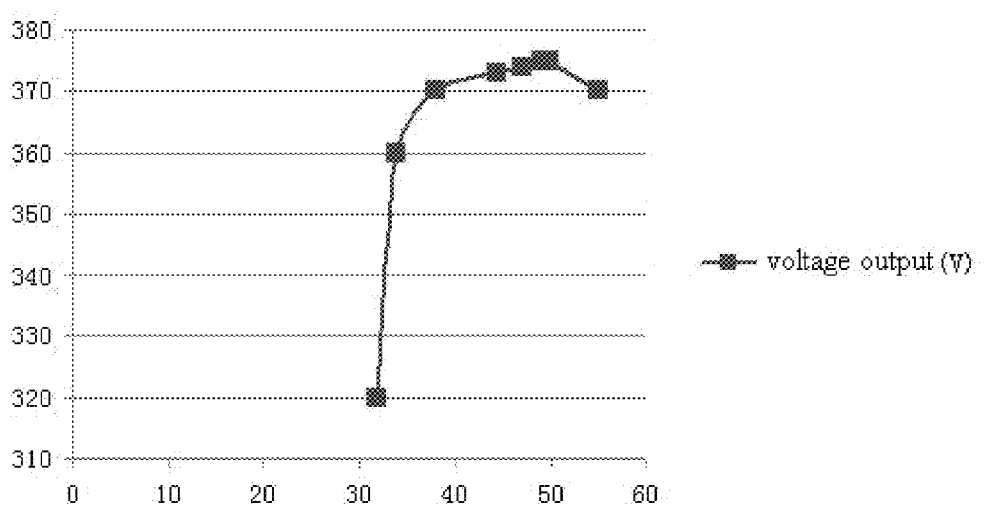
FIG. 6 shows the relation between the voltage and frequency of the frequency converter.

The cooling system of the direct air-cooling system of the present invention is shown as FIG. 2. It includes the following devices, a transformer, a frequency converter, an electric motor, a speed reducer and a fan. The reactor shown in the figure is arranged to restrain the interference of harmonic waves to the electric motor, and without arranging it or replacing with a filter is also possible.

As shown in FIG. 2, the voltage of the power supply is reduced from a high voltage (10 KV or 6 KV) to 400V by the transformer, and frequency adjustable current is supplied by the frequency converter to the electric motor, which drives the speed reducer, so that the speed reducer drives the fan to rotate and the system is provided with cooling air.

As the transformer, a dry type is usually adopted, and the voltage of the high voltage terminal is usually designed as 10 KV or 6 KV, while the low voltage terminal 400 v (the specific value of the low voltage terminal is subjected to that the working voltage of the electric motor reaches 380-390V, and such 400V is chose in consideration of the systematic voltage drop according to the statistical).

As to existing systems, it is required to adjust the voltage output of the transformer to 400V, which is achieved by adjusting the connecting switch of the high voltage terminal.

The adjustment procedure to existing systems is as follows:

1. Before the transformer is put into service, the tap plate is adjusted to an appropriate position according to the nameplate and the tap indicator of the transformer.

2. As for transformers without excitation voltage regulation, in case of completely disconnected from the power grid (high, low voltage terminals are both disconnected), a triphase simultaneous regulation on basis of the tap position is carried out by the user according to the voltage of the power grid at that time.

3. As for on-load voltage regulation transformers, the number of turns of the loop is changed by an automatic controller or electro, hand operations.

As the frequency converter, its capacity is calculated from the shaft power of the electric motor, and converting the speed reducer efficiency, the electric motor efficiency, the electric motor temperature derating capacity coefficient, the long electrical cable derating capacity coefficient, the output reactor derating capacity coefficient, the harmonic wave derating capacity coefficient, and the frequency converter temperature derating capacity coefficient to the input side of the frequency converter, according to existing standards. A frequency of 40-47 HZ is output by the frequency converter to the electric motor.

As the input reactor, a reactor with a voltage drop range of 1-5% is usually chosen, so that the restrain degree of the interference of harmonic waves to the power grid is controlled within the scope of national standards.

As the output reactor, a reactor with the inductance between 30-50 μH is adopted, so that the interference of harmonic waves to the electric motor is effectively restrained.

At maximum output capacity, the working voltage of the electric motor is 380-390V, and the working frequency is 40-47 HZ.

Accordingly, the velocity ratio of the speed reducer should be set as (the rotation rate of the electric motor at 40-47 HZ)/(110% of the rating rotation rate of the fan).

In consideration of the influence of environmental transection wind, the flow rate allowance of the fan should not be lower than 30%, and the velocity ratio of the speed reducer should be set as (the rotation rate of the electric motor at 40-47 HZ)/(110-130% of the rating rotation rate of the fan), whereas specific values are determined in accordance with the environmental wind.

In order to ensure a stable operation of the system of the present invention, the long-term operation voltage endurance of devices in the cooling system can be set as: the transformer: 420V; the frequency converter: 480V; and the electric motor: 400V.

An example of the cooling system of the present invention is: the transformer is connected to a 6 KV voltage of the power grid, which is converted to a 400V voltage; the import reactor is connected to the 400V voltage, and outputs a 395V voltage to the frequency converter; the frequency converter works at a frequency of 42 HZ, and outputs a voltage of 395V to the output reactor; the output reactor which is connected to the 395V voltage outputs a voltage of 380V through cables; and the electric motor works at a voltage of 380V and a frequency of 42 HZ. At around 2 m/s ambient wind velocity, the speed reducer drives the fan, which blows head-on to the heat radiator, according to a velocity ratio of (the rotation rate of the electric motor at 42 HZ)/(115% of the rating rotation rate of the fan). Thereby, the wind speed is increased by 8%.

Another example of the present invention is: the transformer of the system is connected to a 6 KV voltage of the power grid, which is converted to a 400V voltage; the import reactor is connected to the 400V voltage, and outputs a 396V voltage to the frequency converter; the frequency converter works at a frequency of 40 HZ, and outputs a voltage of 396V to the output reactor; the output reactor which is connected to the 396V voltage outputs a voltage of 382V through cables; and the electric motor works at a voltage of 382V and a frequency of 40 HZ. At around 1 m/s ambient wind velocity, the speed reducer drives the fan, which blows head-on to the heat radiator, according to a velocity ratio of (the rotation rate of the electric motor at 40 HZ)/(110% of the rating rotation rate of the fan). Thereby, the wind speed is increased by 12%.

Another example of the present invention is: the transformer of the system is connected to a 10 KV voltage of the power grid, which is converted to a 400V voltage; the import reactor is connected to the 400V voltage, and outputs a 398V voltage to the frequency converter; the frequency converter works at a frequency of 47 HZ, and outputs a voltage of 398V to the output reactor; the output reactor which is connected to the 398V voltage outputs a voltage of 390V through cables; and the electric motor works at a voltage of 390V and a frequency of 40 HZ. At around 6 m/s ambient wind velocity, the speed reducer drives the fan, which blows head-on to the heat radiator, according to a velocity ratio of (the rotation rate of the electric motor at 47 HZ)/(130% of the rating rotation rate of the fan). Thereby, the wind speed is increased by 14%.

Under a high temperature in summer, at a rating load, a 300 MW direct air-cooling unit of the system of the present invention would have a power generation loss of 30%, and a power loss of 90 MW/H can be avoided with the use of the above-mentioned method.

The invention claimed is:

1. A method for improving cooling capacity of a power station direct air-cooling system, which includes the following steps:
   a) connecting a transformer in a cooling system to a first voltage of a power grid and outputting a second voltage to an electric motor, so that a working voltage of the electric motor reaches 380-390 V;
   b) outputting a frequency of 40-47 Hz from a frequency converter in the cooling system to the electric motor;
   c) driving a fan by the electric motor working under the working voltage of 380-390V and the frequency of 40-47 Hz to rotate according to a set velocity ratio with an aid of a speed reducer, and
   d) delivering cooling wind by the rotating fan head-on to a heat radiator;
   wherein the set velocity ratio of the speed reducer is a rotation rate of the electric motor at the frequency of 40-47 Hz divided by 110-130% of a rating rotation rate of the fan.

2. The method according to claim 1, wherein an output reactor is arranged between the frequency converter and the electric motor to restrain an interference of harmonic waves to the electric motor.

3. The method according to claim 2, wherein an inductance of the output reactor is between 30-50 μH.

4. The method according to claim 2, wherein an input reactor is arranged between the transformer and the frequency converter to restrain the interference of the harmonic waves to the power grid.

5. The method according to claim 4, wherein a voltage drop scope of the input reactor is between 1%-5%.

6. The method according to claim 4, wherein the transformer is connected to the first voltage of 10 KV or 6 KV of the power grid, and the first voltage is transformed to the second voltage of 400 V; the input reactor is connected to the second voltage, and outputs a third voltage of 395-398 V to the frequency converter; the frequency converter functions between the frequency of 40-47 Hz, and outputs a fourth voltage of 395-398 V to the output reactor; the output reactor which is connected to the fourth voltage outputs a fifth voltage of 385-395 V through electrical cables; the electric motor functions under the working voltage of 380-390 V and the frequency of 40-47 Hz.

7. The method according to claim 1, wherein a first operation voltage endurance of the transformer is 420 V; a second operation voltage endurance of the frequency converter is 480 V; a third operation voltage endurance of the electric motor is 400 V.

8. A cooling system for a power station direct air-cooling system, the cooling system includes a transformer which is electrically connected by electrical cables, a frequency converter, an electric motor, a speed reducer and a fan, wherein the transformer is connected to a first voltage of a power grid, and outputs a second voltage to the electric motor through the frequency converter, which outputs a frequency to the electric motor, characterized in that, a working voltage of the electric motor is 380-390 V and the frequency is 40-47 Hz;
   wherein a set velocity ratio of the speed reducer is a rotation rate of the electric motor at the frequency of 40-47 Hz divided by 110-130% of a rating rotation rate of the fan.

9. The system according to claim 8, wherein the system further includes an output reactor arranged between the frequency converter and the electric motor.

10. The system according to claim 9, wherein an inductance of the output reactor is between 30-50 μH.

11. The system according to claim 9, wherein the system further includes an input reactor arranged between the transformer and the frequency converter.

12. The system according to claim 11, wherein a voltage drop scope of the input reactor is between 1%-5%.

13. The system according to claim 8, wherein a first operation voltage endurance of the transformer is 420 V; a second operation voltage endurance of the frequency converter is 480 V; and a third operation voltage endurance of the electric motor is 400 V.

14. The system according to claim 13, wherein the transformer is a dry-type transformer.

* * * * *